3,833,664
METHOD FOR PRODUCING ORGANIC
PEROXIDES
Kazuyoshi Aoshima and Takeshi Komai, Taketoyo-machi,
Japan, assignors to Nippon Oils and Fats Company
Limited, Tokyo, Japan
No Drawing. Filed Dec. 14, 1970, Ser. No. 98,067
Claims priority, application Japan, Dec. 17, 1969,
44/100,916
Int. Cl. C07c 73/00
U.S. Cl. 260—610 R                           3 Claims

ABSTRACT OF THE DISCLOSURE

An organic peroxide is prepared by reacting a tert.-hydroperoxide with a tert.-alcohol by using an acid catalyst in the presence of magnesium sulfate having a dehydrating ability. Said magnesium sulfate can effectively remove water formed during the condensation reaction of the tert.-hydroperoxide with the tert.-alcohol.

---

The present invention relates to a process for the production of organic peroxides by reacting a tertiary hydroperoxide having one or more hydroperoxyl groups with a tertiary alcohol having one or more alcoholic hydroxyl groups.

In such a process for the production of peroxides it has been well known that a small amount of an acidic condensing agent, such as, Friedel-Crafts type catalyst, mineral acids and organic sulfonic acids, is used as a catalyst. Furthermore, it has been also well known that when water formed during the reaction is not removed during such a condensation reaction, the condensation reaction does not sufficiently proceed, and acidic decomposition of unreacted hydroperoxide preferentially occurs and an unexpected danger may be caused. Accordingly, it is very important in order to carry out such a condensation reaction safely to find out an efficient dehydration process.

British Patent No. 896,813 discloses a process for the production of organic peroxides wherein water formed during the reaction is removed from the reaction mixture during the reaction by a distillation under a reduced pressure or by a distillation under a reduced pressure with the aid of a volatile inert organic liquid.

This process needs to regulate the temperature and pressure carefully, in the case when the water produced is removed by the distillation from the reaction system. In addition, when the water produced is removed with the aid of the volatile inert organic liquid, an installation for recovering and purifying said organic liquid is necessary and the reaction apparatus and the operation are complicated. Furthermore, this process is not always suitable for the reaction at a temperature below room temperature and particularly, at a temperature lower than 10° C., it is difficult to remove water from the reaction system in a short time, even if the volatile inert organic liquid is used and therefore the reaction does not proceed favorably.

The inventors have found that the above described demerits in the removal of water by the distillation during the condensation reaction can be obviated, and the reaction can be easily regulated and can be carried out by a very simple apparatus and operation, when a tertiary hydroperoxide having one or more hydroperoxyl groups is reacted with a tertiary alcohol having one or more alcoholic hydroxyl groups in the presence of an acid catalyst and magnesium sulfate having dehydrating ability, the amount of which is larger than that corresponding to the amount of water formed during the reaction (such magnesium sulfate is referred to as "dehydrating magnesium sulfate" hereinafter).

The dehydrating magnesium sulfate to be used in the present invention can be easily prepared by heat treating a commercially available magnesium sulfate $$(MgSO_4 \cdot 7H_2O)$$

to remove water of crystallization. Moreover, if the magnesium sulfate used in the reaction is washed with an organic solvent (for example, methanol) having a low boiling point and then dried by heating, the dehydrating ability can be easily recovered, so that it can be used repeatedly.

Although the reaction was carried out by using anhydrous sodium sulfate and dry calcium chloride, which are well known as a dehydrating agent, the reaction did not satisfactorily proceed and it is surprising that only the dehydrating magnesium sulfate shows a remarkable function.

As the catalyst, a small amount of inorganic or organic acids, such as, perchloric acid, sulfuric acid, methionic acid, toluene sulfonic acid and the like may be used. When the cataylst is added to the mixture of the said alcohol and the said hydroperoxide for the reaction, it is preferable to use the catalyst by diluting with a small amount of an aliphatic acid, such as acetic acid.

In view of efficiency and economy, it is preferable to undergo the reaction in about 1:1 molar ratio of the tertiary hydroperoxide to the tertiary alcohol.

The reaction may be carried out in a broad temperature range but within the range of approximately 0° C. to 80° C., and preferably a temperature from 20° C. to 40° C. is used.

If the starting material of the alcohol is wet, the amount of the dehydrating magnesium sulfate must be naturally increased corresponding to the water content of the alcohol.

The tertiary hydroperoxides to be used in the present invention involve, for example, tertiary alkyl hydroperoxides, such as, tert.-butyl hydroperoxide, tert.-amyl hydroperoxide, tert.-hexyl hydroperoxide, 1,1,3,3-tetramethylbutyl hydroperoxide, 2,5-dimethylhexane-2,5-dihydroperoxide, 2,5-dimethylhexyne-2,5-dihydroperoxide and the like and aralkyl tert.-hydroperoxide, such as cumene hydroperoxide, diisopropylbenzene monohydroperoxide, diisopropylbenzene dihydroperoxide, p-cymene hydroperoxide and the like.

The tertiary alcohols to be used in the present invention involve, for example, aralkyl tert.-alcohols, such as α,α'-dimethylbenzyl alcohol, p(or m)-isopropyl-α,α'-dimethylbenzyl alcohol, and p(or m)-methyl-α,α¹-dimethylbenzyl alcohol, (α,α'-dihydroxy)-diisopropyl benzene and the like.

The following examples are given in illustration of this invention and are not intended as limitations thereof.

EXAMPLE 1

Production of dicumyl peroxide

To a mixture of 190 g. (1.0 mole) of 80% cumene hydroperoxide, 150 g. (1.1 mole) of pure α,α'-dimethylbenzyl alcohol and 40 g. of dehydrating magnesium sulfate was added 20 g. of acetic acid containing 0.9 g. of 70% perchloric acid at 30° C. in 45 minutes while stirring. The stirring was continued for further 2 hours while maintaining the same temperature as described above and when the content of hydroperoxide in the reaction mixture came to be 0.39%, the reaction was stopped. The reaction mixture was washed with a diluted aqueous alkali solution and then with warm water and dehydrated and filtered to obtain an oily product, which was cooled to a temperature of lower than 0° C. to obtain 245 g. of lightly colored crude dicumyl peroxide having a melting point of about 38° C. This product was recrystallized from methanol to obtain 235 g. of dicumyl peroxide having a melting point of 39° C. to 40° C.

For the comparison, the reaction was carried out under the same condition as described above, except that 48 g. of anhydrous sodium sulfate was used instead of dehydrating magnesium sulfate and the sample was taken out at every hour and the content of unreacted cumene hydroperoxide in the reaction mixture was determined. 2 hours after the reaction was started, said content was 22.9%, at 3 hours, it was 22.4% and at 4 hours it was 21.8% and the reaction rate was very slow. The reaction was further continued but the coloring of the reaction mixture was noticeable and an abnormal heat generation due to the acidic decomposition of unreacted hydroperoxide was observed, so that the reaction was stopped.

EXAMPLE 2

Production of cumyl-tert.-butyl peroxide

To a mixture of 136 g. (1.0 mole) of pure α,α-dimethylbenzyl alcohol, 1.0 g. of 70% perchloric acid and 40 g. of dehydrating magnesium sulfate was added dropwise 123 g. (1.1 mole) of 80% tert.-butyl hydroperoxide at 30° C. in 30 minutes while stirring. The resulting mixture was heated to 40° C. and the stirring was further continued for 2 hours and then the reaction mixture was washed with 5% aqueous sodium hydroxide solution and then water and dehydrated and filtered to obtain 195 g. of cumyl-tert.-butyl peroxide having a purity of 95%. $n_{20}=1.4800$. The yield was 89% based on α,α'-dimethylbenzyl alcohol.

EXAMPLE 3

Production of cumyl-tert.-hexyl peroxide

The reaction was carried out in the same manner as described in Example 2 except that 152 g. (1.1 mole) of 85% tert.-hexyl hydroperoxide was used instead of tert.-butyl hydroperoxide to obtain 231 g. of crude cumyl-tert.-hexyl peroxide having a purity of 88%.

This product was distilled at 70° C. under a pressure of 5 mm. Hg to distil off impurities having a low boiling point to obtain 211 g. of cumyl-tert.-hexyl peroxide having a purity of 96%. The yield was 86% based on α,α'-dimethylbenzyl alcohol.

EXAMPLE 4

Production of 2,5-dimethyl-2,5-dicumyl peroxyhexane

To a mixture of 136 g. (1 mole) of pure α,α'-dimethylbenzyl alcohol, 2.0 g. of 70% sulfuric acid and 35 g. of dehydrating magnesium sulfate was added little by little 81.5 g. (0.45 mole) of 98% 2,5-dimethyl-2,5-dihydroperoxyhexane at 30° C. while stirring by taking care of temperature. Thereafter the resulting mixture was heated to 40° C. and the reaction was continued. When the content of hydroperoxide in the reaction mixture became less than 1 wt. percent, a calculated amount of solid sodium carbonate was added thereto to neutralize sulfuric acid. The thus treated reaction mixture was fully washed with warm water at about 50° C. To the resulting light yellow oily product was added methanol and a recrystallization was effected to obtain 168 g. of white crystalline 2,5-dimethyl-2,5-dicumyl peroxyhexane having a melting point of 55.5° C.

EXAMPLE 5

Production of 2,5-dimethyl-2,5-dicumyl peroxyhexyne

The reaction was carried out under the completely same condition as described in Example 4, except that 81.5 g. (0.45 mole) of 2,5-dimethyl-2,5-dihydroperoxyhexyne was used instead of 2,5-dimethyl-2,5-dihydroperoxyhexane to obtain 161 g. of 2,5-dimethyl-2,5-dicumyl peroxyhexyne having a melting point of 58° C.

EXAMPLE 6

Production of α,α'-bis(tert.-butylperoxy)-m-diisopropylbenzene

To a mixture of 202 g. (1 mole) of (α,α'-dihydroxy)-diisopropylbenzene having a purity of 96%, 250 g. of benzene, 6 g. of 70% perchloric acid and 40 g. of dehydrating magnesium sulfate was added 224 g. (1 mole) of 80% tert.-butyl hydroperoxide at 30° C. while stirring by taking care of temperature. The stirring was further continued at the same temperature as described above and when the content of the hydroperoxide in the reaction mixture came to be 0.5 wt. percent, the reaction was stopped. The reaction mixture was washed with 5% aqueous sodium hydroxide solution and then warm water and dehydrated and filtered. The resulting product was distilled under a reduced pressure to distill off benzene.

To the resulting lightly colored viscous oily product was added methanol and the mixture was cooled to a temperature of lower than 0° C. to obtain 278 g. of white crystalline α,α'-bis(tert.-butylperoxy) - m - diisopropylbenzene having a melting point of 50° C.

What is claimed is:

1. A process for the production of an organic peroxide comprising reacting a tert.-hydroperoxide having one or more hydroperoxyl groups with a tert.-alcohol having one or more alcoholic hydroxyl groups in the presence of an acid catalyst selected from the group consisting of perchloric acid, sulfuric acid, methionic acid and toluene sulfonic acid, at a temperature of from 0° C. to 80° C. in the presence of a dehydrating magnesium sulfate as a dehydrating agent in a quantity sufficient to take up the amount of water formed during the reaction.

2. The process as claimed in claim 1, wherein said magnesium sulfate is prepared by heat treating magnesium sulfate ($MgSO_4 \cdot 7H_2O$) to remove water of crystallization.

3. The process as claimed in claim 1, wherein said reaction is carried out at a temperature of 20° C. to 40° C.

References Cited

UNITED STATES PATENTS

| | | | |
|---|---|---|---|
| 3,310,588 | 3/1967 | Kloosterman et al. | 260—610 R |
| 3,337,639 | 8/1967 | Stedehouder et al. | 260—610 R |
| 3,420,891 | 6/1969 | Mageli et al. | 260—610 R |
| 3,505,363 | 4/1970 | Milas | 260—389 |

FOREIGN PATENTS

| | | | |
|---|---|---|---|
| 792,558 | 3/1958 | Great Britain | 260—610 R |
| 896,813 | 5/1962 | Great Britain | 260—610 R |

BERNARD HELFIN, Primary Examiner

W. B. LONE, Assistant Examiner